Oct. 31, 1967  H. L. PASTAN  3,349,623
FLUID FILLED PRESSURE TRANSDUCER
Filed June 9, 1965
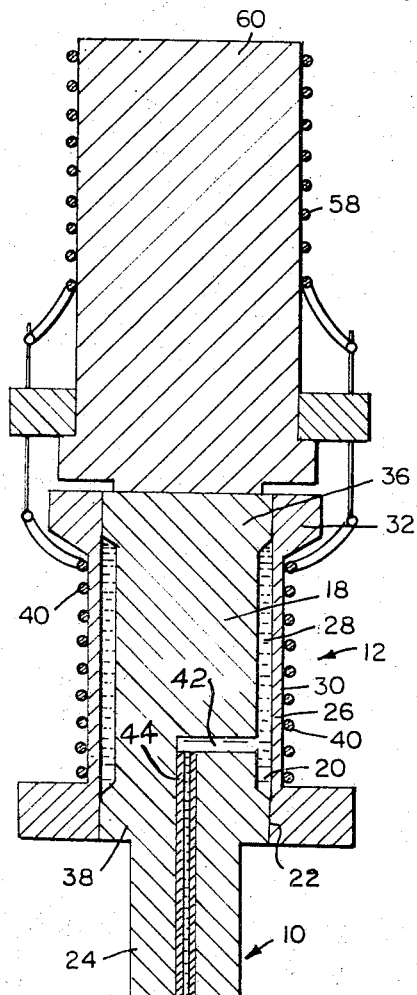
FIG. 1
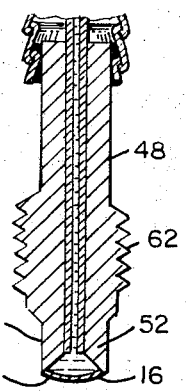
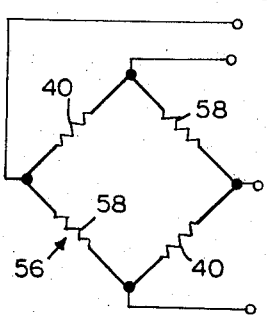
FIG. 3
FIG. 2
INVENTOR
HARVEY L. PASTAN
BY,
Wolf, Greenfield & Hicken
ATTORNEYS

United States Patent Office 3,349,623
Patented Oct. 31, 1967

3,349,623
FLUID FILLED PRESSURE TRANSDUCER
Harvey L. Pastan, Brookline, Mass., assignor to Abex Corporation, a corporation of Delaware
Filed June 9, 1965, Ser. No. 462,542
10 Claims. (Cl. 73—398)

ABSTRACT OF THE DISCLOSURE

A pressure transducer with a coupler at one end and a sensor at the other connected by a capillary tube. Volumetric displacement is minimized by limiting the total liquid fill to the order of .004 cubic inch.

---

This invention relates to pressure transducers and more particularly comprises a new and improved fluid filled direct sensing pressure transducer.

Fluid filled direct sensing pressure transducers are designed to be used in those systems in which it is undesirable for the medium whose pressure is being measured to enter into the instrument. In such cases the instrument itself is filled with a fluid which is coupled by means of a diaphragm or some other device to the medium whose pressure is to be measured, and the fluid which fills the instrument directly transmits the pressure of the medium to the sensing device. The fluid fill must necessarily have a boiling point higher than the boiling temperature of the medium to which the instrument is exposed, as the introduction of vapor pressure into the gage will produce extraneous readings at the sensing device which are not representative of the pressure being measured. Similarly, the freezing point of the fluid should be lower than the minimum operating range temperature.

One important object of this invention is to provide a fluid filled pressure transducer providing full scale deflection of the sensing device with a minimum volumetric displacement. The minimum volumetric displacement of the fluid filling the instrument will minimize the effect upon the fluid medium whose pressure is being measured. The minimum volumetric displacement necessarily results in a minimum coupler deflection, and if the coupler is a diaphragm, minimum deflection will maintain the diaphragm deflection within the linear range. Diaphragm deflection should not exceed 3% of the diaphragm diameter to maintain this linear operation.

Another important object of this invention is to provide a fluid filled pressure transducer which dissipates the effect of fluid expansion. If the effect of fluid expansion is not dissipated, it will cause displacement of the sensing device, which in turn will render an extraneous pressure measurement.

Yet another important object of this invention is to provide a fluid filled pressure transducer which is capable of sensing fluid pressures at relatively inaccessible locations.

To accomplish these and other objects, the pressure transducer of this invention includes a frame having a capillary tube extending therethrough which at one end communicates with a chamber defined in part by the coupler. The other end of the capillary tube communicates with a strain gage type sensing device which has very small deflection throughout its full operative range. A liquid fills the sensing device, chamber and capillary tube so as to directly transmit the pressure applied against the diaphragm to the sensing device to render a pressure measurement. In accordance with one embodiment of this invention, a temperature sensing capsule is disposed adjacent the diaphragm, which forms part of a separate temperature compensating system to balance the effect upon the sensing device of expansion of the liquid which fills the chamber and capillary tube.

These and other objects and features of this invention along with its incident advantages will be better understood and appreciated from the following detailed description of two embodiments thereof, selected for purposes of illustration and shown in the accompanying drawing, in which:

FIG. 1 is a cross-sectional view of one form of fluid filled pressure transducer constructed in accordance with this invention;

FIG. 2 is a cross-sectional view of another embodiment of fluid filled pressure transducer constructed in accordance with this invention; and FIG. 3 is a schematic diagram illustrating the strain gage circuit employed in each of the transducers shown in FIGS. 1 and 2.

The embodiment of this invention shown in FIG. 1 includes a main body 10, a sensing device 12 provided at one end of the body 10, a capillary tube 14 which extends through the body 10, and a coupler 16 secured to and closing the other end of the body.

The body 10 has an upper generally cylindrical portion 18 provided with an annular recess 20 formed in its outer surface 22 and a stem 24 which extends from the upper portion 18 toward the diaphragm coupler 16. The upper body portion 18 is surrounded by a sleeve 26 that encloses the shallow annular recess 20 so as to define with it a closed pressure chamber 28. The wall 30 of the sleeve 26 is relatively thin and flexible and therefore is capable of barrelling outwardly in response to pressure in the chamber 20. The ends 32 and 34 of the sleeve 26 are welded or otherwise secured to the adjacent ends 36 and 38, respectively, of the upper body portion 18 so as to prevent elongation of the sleeve under pressure.

The upper body portion 18 and the sleeve 26 along with their incident parts described above, define the sensing device 12 for the gage. It will be noted that strain gage windings 40 are bonded circumferentially about the outer surface of the wall 30 of the sleeve 26, which sense the distortion of the wall 30 under changes of pressure within the chamber 28.

The chamber 28 of the sensing device 12 communicates through a passage 42 within the upper body portion 18 with the upper end 44 of the capillary tube 14 imbedded in the body 10. The capillary tube 14 extends downwardly through the stem 24 of the body, a protective jacket 46 and a lower stem 48 to a small chamber 50 enclosed by the coupler 16.

The protective jacket 46 may either be rigid or flexible depending upon the particular use for which the transducer is designed. If the coupler 16 is to be exposed to fluid mediums in relatively inaccessible points in a system, some advantage may be derived from making the jacket 46 out of flexible material such as a wire-type helical cable, and making the combined length of the stem and jacket relatively long.

The diaphragm coupler 16 is relatively flexible and has a low spring rate. It is subject to minimum stresses as it is completely supported on the inside by the fluid 52 which fills the chamber 50. Unlike diaphragms which are connected to and work against push-rods, strain tubes or other similar devices in unfilled instruments, which diaphragms operate at high stress and are subject to diaphragm rupture, the diaphragm of this invention operates at very low stress levels because it is supported on the back side by substantially the same pressure which is exerted against the outside or exposed face. The fluid 52 which fills the chamber 50 also fills the capillary tube 14, passage 42 and annular chamber 28 forming part of the sensing device.

In FIG. 1 it will be noted that the windings 40 are wound circumferentially about the sleeve 26. The windings form two legs of the bridge circuit 56 shown in FIG. 3. The other two legs of the bridge circuit comprise the dummy windings 58 wound about the block 60 secured to the upper end 36 of the upper body portion 18. It is apparent that changes in pressure of the fluid in the chamber 28 will cause the wall 30 of the sleeve 26 to barrel outwardly, and this distortion will be sensed by the active arms 40 of the strain gage bridge circuit shown in FIG. 3, and by means of the different leads connected to the bridge, the bridge may be energized and a reading may be made at a remote location which is indicative of the change in pressure within the chamber 28.

When the transducer is used in a temperature range having a maximum of approximately 600° F. mercury is the ideal fluid to fill the coupler chamber 50, the capillary tube 14, passage 42 and annular chamber 28. Mercury has a low compressibility and a boiling point in excess of 600° F. so that within that operative range no vapor pressures will be generated to cause secondary expansion of the chamber 28 to distort the wall 30 of the sleeve 26.

It was suggested in the introduction that it is extremely desirable that minimum volumetric displacement occur over the full operative range of the transducer. In order to provide the reader with an appreciation of the size of the transducer and the volumetric displacement, some typical dimensions are offered. In the preferred form of this invention, the capillary tube 14 has an inner diameter of approximately .010 inch, and the sensing chamber 28, defined by the gap between the inner surface of the sleeve 26 and the outer surface of the body portion 18 at the recess 20, is .005 inch. The chamber 50 is approximately .010 inch deep measured from the inner surface of the diaphragm 16, and the capacity of the annular chamber 28, passage 42, capillary tube 14, and chamber 50 is only approximately .004 cubic inch.

In FIG. 1 it will be noted that a section of the lower stem 48 is externally threaded as suggested at 62 to facilitate the mounting of the transducer in the wall of a chamber containing the medium whose pressure is to be measured. It is evident that when the lower stem 48 is screwed into the wall, the very short section 64 may extend through the wall. It is important in certain applications that the section which extends through the wall cause a minimum disturbance of the flow of the medium whose pressure is being measured. For example, when the transducer is used to measure the pressure of a plastic melt, the portion 64 should not appreciably interrupt the flow of the plastic, because an interruption in the flow may cause the plastic to deteriorate. Consequently it is important to employ a very small diaphragm 16 so that the diameter of the section 64 which may project into the medium is relatively small. Because the diaphragm 16 is small, and its displacement is necessarily small to remain within the linear range, the total volumetric displacement of the liquid which fills the transducer is also small. The small volumetric displacement of the liquid requires that a sensing device be used which also has a small volumetric displacement over its full operative range. Therefore, such sensing devices as Bourdon tubes which have a relatively large volumetric displacement should not be used in the device. Rather, the strain-gage-type capsule sensing device is used which does not elongate and which experiences only a small volumetric displacement over its full operative range.

By making the diaphragm 16 extremely soft, the diaphragm will dissipate a substantial portio of the effects of expansion of the liquid which fills the transducer. It is important that the expansion of the liquid caused by such conditions as temperature cause a distortion of the diaphragm 16 rather than a distortion of the wall 30 of the sensing device. If the expansion causes a distortion in the sensing device an extraneous reading will be produced at the bridge circuit which will not solely represent changes in pressure on the fluid.

In the embodiment shown in FIG. 2 a temperature compensating subassembly is incorporated into the device which may otherwise be the same as the embodiment of FIG. 1. This subassembly is particularly desirable when the transducer is designed to operate over a wide temperature range and the diaphragm coupler is unable to wholly dissipate the effects of liquid expansion. The transducer shown includes a body 70 very similar to the body 10 of the embodiment of FIG. 1 which at its upper end defines a sensing device 72. The sensing device 72 may be identical to the sensing device 12. The annular chamber (not shown) of the sensing device is connected by a capillary tube 74 to the chamber 76 at the bottom of the lower stem 78 enclosed by the soft diaphragm 80. Thus, when the diaphragm 80 is exposed to a pressurized medium, that pressure is transmitted through the liquid 82 which fills the chamber 76, capillary 74 and the annular chamber (not shown) in the sensing device.

Unique to this embodiment is the temperature compensating subassembly 84 which includes a second capillary tube 86 having a temperature bulb 88 at its lower end 90 within the chamber 76. The capillary tube 86 extends through the sensing device 72 and its upper end 92 communicates with a passage 94, in the second sensing device 96. The sensing device 96 is substantially identical to the sensing device 72 and includes an annular chamber 98 surrounded by a thin-walled sleeve 100 which in turn carries the strain gages 102. The strain gages 102 are connected in a bridge circuit with the gages 104 about the sensing device 72. Thus, unlike the strain gage circuit of the embodiment of FIG. 1, the circuit of the embodiment of FIG. 2 has four active legs.

The bulb 88, capillary 86, passage 94 and annular chamber 98 are filled with the same fluid which fills the chamber 76, capillary 74 and annular chamber of the sensing device 72. Thus, the liquid in the temperature compensating subassembly 84 experiences the same expansion as does the liquid in the capillary 74 and annular chamber of the sensing device 72. However, because the bulb 88 is closed and nonyielding, the liquid which fills the temperature compensating subassembly is not subjected to changes in pressure through the diaphragm coupler 80. Rather, changes in pressure are experienced only by the sensing device 72. By connecting the four strain gage windings as shown in FIG. 3, it will be appreciated that the four active legs will cause any distortion of the gages 104 due to expansion of the liquid to be canceled by the corresponding distortion of the gages 102 in the temperature compensating subassembly. Because the diaphragm 80 is soft, care should be taken in the embodiment of FIG. 2 not to overcompensate for temperature effects. To avoid overcompensation, it may be necessary to use a thicker-walled sleeve 100, or less sensitive strain gages 102 in the sensing device 96 than for the windings 104, because certain of the effects on windings 104 will be lessened due to the flexibility of the diaphragm 80.

From the foregoing description those skilled in the art will appreciate that numerous modifications may be made of this invention without departing from its spirit. Therefore, it is not intended to limit the breadth of this invention to the embodiments illustrated and described. Rather, it is intended that the breadth of this invention be determined by the appended claims and their equivalents.

What is claimed is:
1. A pressure transducer comprising
   an elongated frame,
   a capillary tube extending through the frame and terminating at one end adjacent one end of the frame, said tube having an inner diameter in the order of .010 inch,
   a coupler closing that end of the frame and defining with the frame a chamber in communication with the capillary tube, a liquid filled deformable sensor secured to the frame at its other end remote from the coupler, and a liquid filling the capillary tube and the chamber and in communication with the liquid in the sensor for applying the pressure exerted against the coupler to the sensor.

2. A pressure transducer as defined by claim 1 further characterized by said sensor comprising a capsule having a deformable cylindrical wall in contact with the liquid, and strain gage windings bonded to that wall to measure the pressure applied to the wall by the liquid.

3. A pressure transducer as defined in claim 2 further characterized by said liquid filling the tube, chamber and capsule having a combined volume in the order of .004 cubic inch.

4. A pressure transducer as defined in claim 3 further characterized by said coupler comprising a soft flexible diaphragm.

5. A pressure transducer as defined in claim 1 further characterized by said frame having a bendable section through which the capillary tube extends from the coupler to the sensor.

6. A pressure transducer comprising an elongated frame, a first capillary tube extending through the frame and terminating at one end adjacent one end of the frame, a coupler closing that end of the frame and defining with the frame a chamber in communication with the capillary tube, a first liquid filled strain gage sensor secured to the frame at its other end remote from the coupler, a first liquid filling the capillary tube and the chamber and in communication with the liquid in the first sensor for applying the pressure exerted against the coupler to the sensor, a second capillary tube extending through the frame, a temperature sensing bulb connected to the end of the second tube and disposed adjacent the coupler, a second liquid filled strain gage sensor connected to the second tube remote from the coupler, a second liquid filling the second tube and the bulb and in communication with the second sensor for applying the effects of change in temperature of the second liquid to the second sensor, and a bridge circuit made of the strain gages of each sensor.

7. A pressure transducer as defined in claim 6 each of the sensors comprising a capsule having a deformable cylindrical wall in contact with the liquid and strain gage windings bonded to the wall.

8. A pressure transducer as defined in claim 6 further characterized by said coupler comprising a soft flexible diaphragm.

9. A pressure transducer as defined in claim 6 further characterized by said frame having a bendable section through which the capillary tubes extend from the sensors to the coupler and sensing bulb.

10. A pressure transducer as defined in claim 9 further characterized by said first liquid and the liquid in the sensor having a combined volume in the order of .004 cubic inch.

References Cited
UNITED STATES PATENTS

| | | | |
|---|---|---|---|
| 3,180,154 | 4/1965 | Li et al. | 73—395 X |
| 3,273,400 | 9/1966 | Pastan | 73—406 X |

LOUIS R. PRINCE, *Primary Examiner.*

D. O. WOODIEL, *Assistant Examiner.*